US009468868B2

(12) United States Patent
Chen et al.

(10) Patent No.: US 9,468,868 B2
(45) Date of Patent: Oct. 18, 2016

(54) WATER REMOVING DEVICE FOR EXTREMELY HIGH WATER CONTENT THREE-PHASE FLOW, AND MEASUREMENT DEVICE AND METHOD FOR EXTREMELY HIGH WATER CONTENT THREE-PHASE FLOW

(75) Inventors: Jige Chen, Gansu (CN); Zhengang Wang, Gansu (CN); Hai Yu, Gansu (CN); Junjie Ye, Gansu (CN)

(73) Assignee: LANZHOU HAIMO TECHNOLOGIES CO., LTD., Gansu (CN)

(*) Notice: Subject to any disclaimer, the term of this patent is extended or adjusted under 35 U.S.C. 154(b) by 918 days.

(21) Appl. No.: 13/508,348

(22) PCT Filed: Nov. 5, 2010

(86) PCT No.: PCT/CN2010/001781
§ 371 (c)(1),
(2), (4) Date: Jun. 11, 2012

(87) PCT Pub. No.: WO2011/054192
PCT Pub. Date: May 12, 2011

(65) Prior Publication Data
US 2012/0253705 A1 Oct. 4, 2012

(30) Foreign Application Priority Data
Nov. 7, 2009 (CN) .................... 2009 2 0144256 U

(51) Int. Cl.
*B01D 19/00* (2006.01)
*B01D 17/02* (2006.01)
(Continued)

(52) U.S. Cl.
CPC ....... *B01D 19/0031* (2013.01); *B01D 17/0208* (2013.01); *B01D 17/0214* (2013.01); *B01D 17/10* (2013.01); *B01D 17/12* (2013.01); *G01F 1/34* (2013.01); *G01F 1/74* (2013.01)

(58) Field of Classification Search
CPC ................................. B01D 19/0031
USPC ...... 702/47; 210/521, 188; 95/243, 268, 253
See application file for complete search history.

(56) References Cited

U.S. PATENT DOCUMENTS

| 3,228,174 A * | 1/1966 | Perry, Jr. ............ B01D 19/0052 55/484 |
| 3,394,530 A | 7/1968 | O'Neill et al. |

(Continued)

FOREIGN PATENT DOCUMENTS

| CA | 915589 A | 11/1972 |
| CN | 1182873 A | 5/1998 |

(Continued)

OTHER PUBLICATIONS

Supplementary European Search Report, in corresponding European Application No. EP 10827806, dated Apr. 22, 2014.

*Primary Examiner* — John Breene
*Assistant Examiner* — Raymond Nimox
(74) *Attorney, Agent, or Firm* — Knobbe, Martens, Olson & Bear LLP

(57) ABSTRACT

An extremely high water cut oil-gas-water three phase flow water removing device includes a mist eliminator (8), a fluid stabilizer (7), a liquid collection chamber (2), a fluid directing duct (5), an inlet connection pipe section (10), a gas outlet connection pipe section (9), a mixture liquid exit connection pipe section (4), a free water outlet connection pipe section (1). The function of the device is to effectively remove most of the free water from the high water cut oil-air-water three phase flow mixture liquid. An extremely high water cut oil-air-water three phase flow measurement apparatus and a measurement method using the water removing device are also disclosed.

16 Claims, 5 Drawing Sheets

(51) Int. Cl.
  *B01D 17/00* (2006.01)
  *B01D 17/12* (2006.01)
  *G01F 1/34* (2006.01)
  *G01F 1/74* (2006.01)

(56) References Cited

U.S. PATENT DOCUMENTS

| | | | |
|---|---|---|---|
| 3,727,382 A | | 4/1973 | Jackson |
| 4,059,517 A | | 11/1977 | Strahorn et al. |
| 4,424,068 A | | 1/1984 | McMillan |
| 5,390,547 A | * | 2/1995 | Liu .................. G01F 15/08 |
| | | | 73/200 |
| 6,032,539 A | * | 3/2000 | Liu .................... G01F 1/74 |
| | | | 73/861.04 |
| 6,128,962 A | * | 10/2000 | Marrelli ............. G01F 1/74 |
| | | | 324/638 |
| 6,164,458 A | | 12/2000 | Mandrin et al. |
| 6,214,220 B1 | | 4/2001 | Favret, Jr. |
| 6,802,204 B1 | * | 10/2004 | Torkildsen ........... G01F 15/08 |
| | | | 73/61.44 |
| 2003/0150324 A1 | | 8/2003 | West |
| 2007/0084340 A1 | * | 4/2007 | Dou .................. B01D 19/0057 |
| | | | 95/8 |
| 2007/0089609 A1 | * | 4/2007 | Dou ..................... G01F 1/74 |
| | | | 96/208 |
| 2007/0204750 A1 | * | 9/2007 | Liu .................. B01D 17/0211 |
| | | | 96/182 |
| 2009/0152204 A1 | * | 6/2009 | Chantrel ........... B01D 17/0217 |
| | | | 210/718 |

FOREIGN PATENT DOCUMENTS

| | | |
|---|---|---|
| CN | 1155431 C | 6/2004 |
| JP | 8252576 A | 5/1987 |
| SU | 1313484 A1 | 5/1987 |
| WO | WO 95/10345 A1 | 4/1995 |
| WO | WO 99/65588 A1 | 12/1999 |

* cited by examiner

WATER REMOVING DEVICE FOR EXTREMELY HIGH WATER CONTENT THREE-PHASE FLOW, AND MEASUREMENT DEVICE AND METHOD FOR EXTREMELY HIGH WATER CONTENT THREE-PHASE FLOW

FIELD OF THE INVENTION

The invention relates to a water removing device for oil-gas-water three phase flow mounted to a petroleum pipe line of the oilfield, and a measurement apparatus which uses the water removing device and a method for measuring the flow rates of oil, gas and water in the three phase flow in the petroleum pipe line.

DESCRIPTION OF THE PRIOR ART

At present, many onshore oilfields have entered into a stage of extremely high water cut. The accurate flow rates of oil, gas and water in each of the extremely high water cut wells are the foundation of oil recovery, and they also are the main basis for production optimization and reservoir management.

In order to obtain mentioned-above data, a multi-phase flow metering system has developed recently. The multi-phase flow metering system has been wildly applied to single-well metering due to the benefits such as its small footprint, simple installation and maintenance, high precision, and continuously real time measuring the oil-gas-water three-phase flow without separating oil-gas-water, and it played an important role in the digitized oil-field system. The measurement process for the oil-gas-water multiphase flow by the present multi-phase flow metering system is generally as follows:

1) measuring the total flow rate Q, the water cut WC and the gas volume fraction GVF;
2) calculating the gas flow rate: $Q_g=Q*GVF$;
3) calculating the liquid flow rate: $Q_l=Q*(1-GVF)$;
4) calculating the oil flow rate: $Q_o=Q_l*(1-WC)$;
5) calculating the water flow rate: $Q_w=Q_l*WC$.

Furthermore, in the products of oil wells, the relative contents of the three components of oil, gas and water may change greatly: the products may have high gas volume fraction (the gas volume fraction is close to 100%) or be all liquid (the gas volume fraction is 0%); in the liquid phase, the liquid may be all oil (the water cut is 0%) or have high water cut (the water cut is nearly 100%). And the products may be in any combination of the above extreme values. For the case of the extremely high water cut (the water cut is above 95%), as illustrated in FIG. 1, at different water cut level, the oil flow rate error caused by the measurement error of the water cut is characterized by "funnel effect", the higher the water cut level is, the greater the error of the pure oil flow rate is. However, the measurement accuracy for the water cut of the present multi-phase flow metering system is general about 2%. Therefore, at the level of the extremely high water cut, the measurement error of the water cut would cause a extremely great error of the pure oil measurement, which restrict in a great extent the application of the present multi-phase flow meter in this situation.

In the conventional separation type multi-phase flow metering system, the product of the oil well is separated into oil, gas and water, which is then metered in the corresponding outlet, respectively. However, the costs of buying and operating the system is too high; a continuous real time metering could not be realized for a single well; the separation efficiency is affected by many factors; and particularly in the case of extremely high water cut, the system requires a longer stable time before metering, and the efficiency of oil-water separation is poor in the oil line, thereby the representation of the metering result of the pure oil is poor and error is great. Secondly, since the structure and the flow process of the oil-gas-water three-phase separator are complex, and the separator is heavy and has a big footprint, thereby the maintenance and management of the separator are quite complex, so that the costs of establishment, operation and maintenance of the separator are high, which is detrimental to the automation of the production process and the management, especially in the marginal oilfields (particularly the oil fields in the stage of extremely high water cut).

SUMMARY OF THE INVENTION

Therefore, in order to increase the measurement accuracy of the water and pure oil flow rate in the case of extremely high water cut, and meet the requirement for oilfield production metering, a first object of the present invention is to provide a water removing device mounted on the petroleum pipe line of the extremely high water cut oil-gas-water three-phase flow, so as to reduce the water cut of the oil-gas-water three-phase flow and meet the requirement of the measurement accuracy of the pure oil.

A second object of the present invention is to provide a measurement apparatus for oil-gas-water three phase flow, which is mounted on the petroleum pipe line to continuously measure the flow rates of oil, gas and water in the extremely high water cut three phase flow using the water removing device for extremely high water cut oil-gas-water three phase flow according to the present invention.

A third object of the present invention is to provide a measurement method for measuring the flow rates of oil, gas and water in the extremely high water cut three phase flow using the measurement apparatus according to the present invention.

In order to achieve the first object, the invention is to provide a water removing device for extremely high water cut oil-gas-water three phase flow, which can automatically and effectively separate out most of the free water, reduce the water cut in the remaining oil-water mixture liquid, thus can measure the water cut under a lower water cut level, thereby increase the measurement accuracy for the flow rate of the pure oil. The water removing device of the present invention includes a housing, a liquid collection chamber, an inlet connection pipe section, a gas outlet connection pipe section and a free water outlet connection pipe section, a mixture liquid outlet connection pipe section, a mist eliminator, a fluid stabilizer, an oil filter, an oil discharging duct with a baffle plate, and a pressure differential transmitter or other type of liquidometer, which is mounted on a side of the housing and used for liquid level control. A gas-liquid gravity separation process is occurred in the water removing device after the extremely high water cut oil-gas-water three phase flow entered into the water removing device via the inlet connection pipe section. The gas mist-eliminated via the mist eliminator is discharged from the gas outlet connection pipe section. The liquid entered into the lower portion of the water removing device via the liquid stabilizer. The free water is discharged from the outlet of the free water outlet connection pipe section via the oil filter. The oil-water mixture or oil-gas-water mixture on the upper part of the liquid is discharged via the oil discharging duct. In the process of the free water removing, the pressure differential transmitter or the liquidometer may be used to detect the liquid level in the water removing device to provide an adjustment signal for the control system.

In order to achieve the second object, the invention is to provide a measurement apparatus for measuring the flow rate of the extremely high water cut oil-gas-water three phase flow mounted on the petroleum pipe line using the water removing device for extremely high water cut oil-gas-water three phase flow according to the present invention, also including: a total flow rate metering pipe section connected with the inlet connection pipe section of the water removing device, a gas discharging pipe section connected with the gas outlet connection pipe section of the water removing device, an oil discharging pipe section connected with the mixture liquid outlet connection pipe section of the water removing device, a water discharging pipe section connected with the free water outlet connection pipe section of the water removing device, a flow collection pipe section, a calculating unit of the computer or a flow computer. The total flow rate metering pipe section includes a densimeter, such as a single-γ densimeter/phase fraction meter, a differential pressure type flow measurement device such as a Venturi tube, a blind three-way mixing means as well as a temperature transmitter, a pressure transmitter and a pressure differential transmitter which are mounted to this metering pipe section. A control valve is provided on the gas discharging pipe section. The water discharging pipe section includes a single-phase flow meter such as an electromagnetism flow meter for metering the water flow rate, a control valve and a check valve. An oil-gas-water three-phase water cut meter such as a dual-γ water cut meter is mounted on the oil discharging pipe section. The computer unit is used to calculate the total volume flow rate Q, the pure oil volume flow rate $Q_o$, the gas volume flow rate $Q_g$ and the water volume flow rate $Q_w$.

In order to achieve the third object, the invention is to provide a measurement method for measuring the flow rate of the extremely high water cut oil-gas-water three phase flow, which includes the steps of:

1) making the extremely high water cut oil-gas-water three phase flow within the petroleum pipe line enter into the blind three-way mixing pipe section where the extremely high water cut oil-gas-water three phase flow is mixed.

2) making the extremely high water cut oil-gas-water three phase flow pass through the blind three-way mixing pipe section and enter into the metering pipe section, which is consisted of the densimeter, such as a single-γ densimeter/phase fraction meter, the differential pressure type flow measurement device such as a Venturi tube, the temperature transmitter, the pressure transmitter, where the differential pressure ΔP of the total flow rate of the extremely high water cut oil-gas-water three phase flow, the gas volume fraction GVF, the temperature and the pressure are measured.

3) making the extremely high water cut oil-gas-water three phase flow enter the water removing device.

4) making the extremely high water cut oil-gas-water three phase flow gas-liquid separated in the water removing device, liquid-rectified, and free water-separated, then the gas is discharged from the outlet of the gas discharging pipe section, most of the free water is discharged from the outlet of the free water discharging pipe section, and metering the free water flow rate $Q'_w$ in the water discharging pipe section, the remaining oil-water mixture is discharged from the outlet of the oil discharging pipe section, and the water cut WC of the mixture is measured at the water cut meter mounted on the oil discharging pipe section.

5) in the process of liquid discharging, the liquid level within the water removing device is real time detected by the pressure differential transmitter or the liquidometer; The control system of the device is used to adjust the opening degree of the control valve of the free water discharging pipe section and the control valve of the gas discharging pipe section according to the result of the liquid level in order to control the liquid level within the water removing device to a certain height thus to prevent any oil from entering the free water discharging pipe section, prevent the gas from entering the water discharging pipe section, or prevent the excessive gas from entering the oil discharging pipe section or prevent the liquid from entering the gas discharging pipe section.

6)) Calculation

The volume flow rate of the extremely high water cut oil-gas-water multi-phase flow is to be calculated. By the flow rate herein is meant the volume flow rate hereafter referred to as simply flow rate.

The calculation equations are as follows:

the total flow rate: $Q=K\sqrt{\Delta p/\rho_{mix}}$ the gas flow rate: $Q_g=Q*GVF$ the liquid flow rate: $Q_l=Q*(1-GVF)$ the oil flow rate: $Q_o=(Q_l-Q'_w)*(1-WC)$ the water flow rate: $Q_w=Q'_w+(Q_l-Q'_w)* WC$;

wherein K is a system parameter and $\rho_{mix}$ is the mixture density of the three-phase flow.

The measurement apparatus for measuring the flow rate of the extremely high water cut oil-gas-water three phase flow can automatically and effectively separate out most of the free water, reduce the water cut in the oil-water mixture liquid, thus can relatively accurately measure the flow rate of the pure oil under a extremely water cut level.

DETAILED DESCRIPTION OF THE PREFERRED EMBODIMENT

Hereinafter, the embodiments of the invention are described in detail with reference to the drawings.

Figure 1:
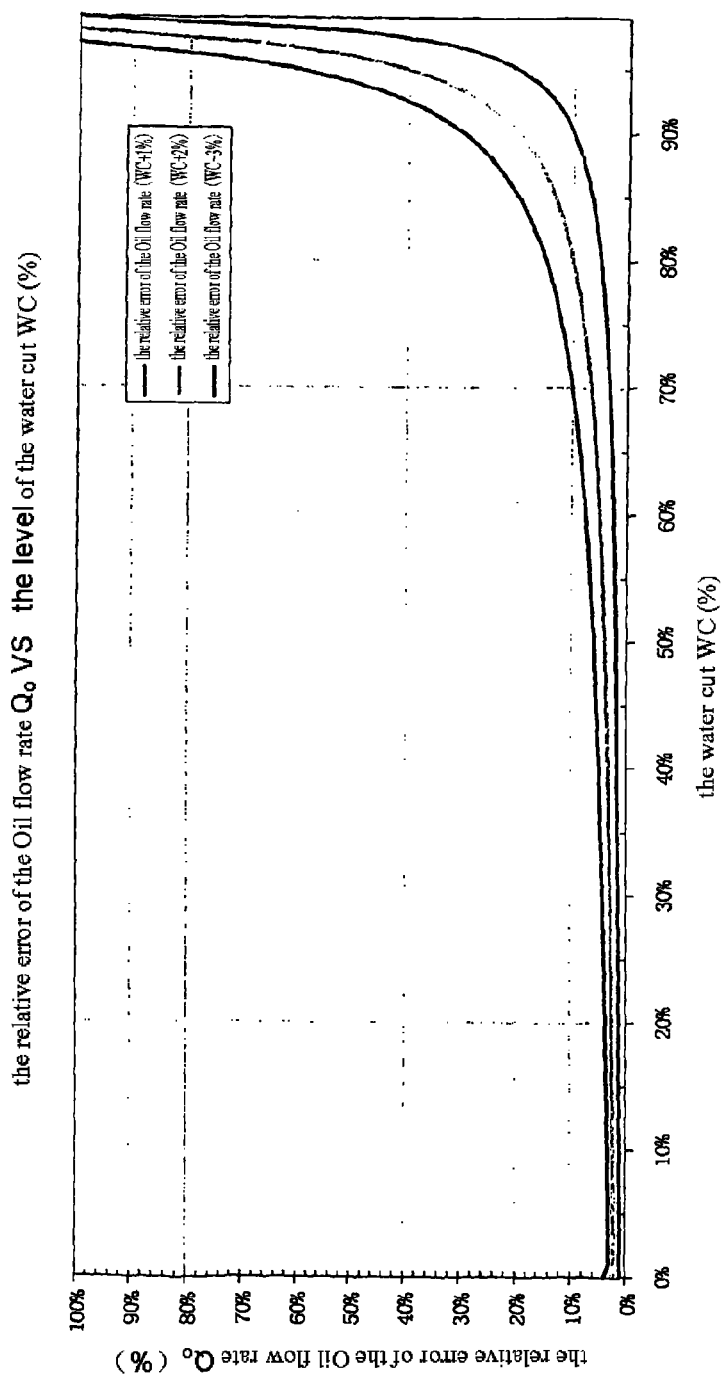
FIG. 1 depicts the relationship of the water cut measurement error and the error of the pure oil flow rate under different water cut levels.
Figure 2:
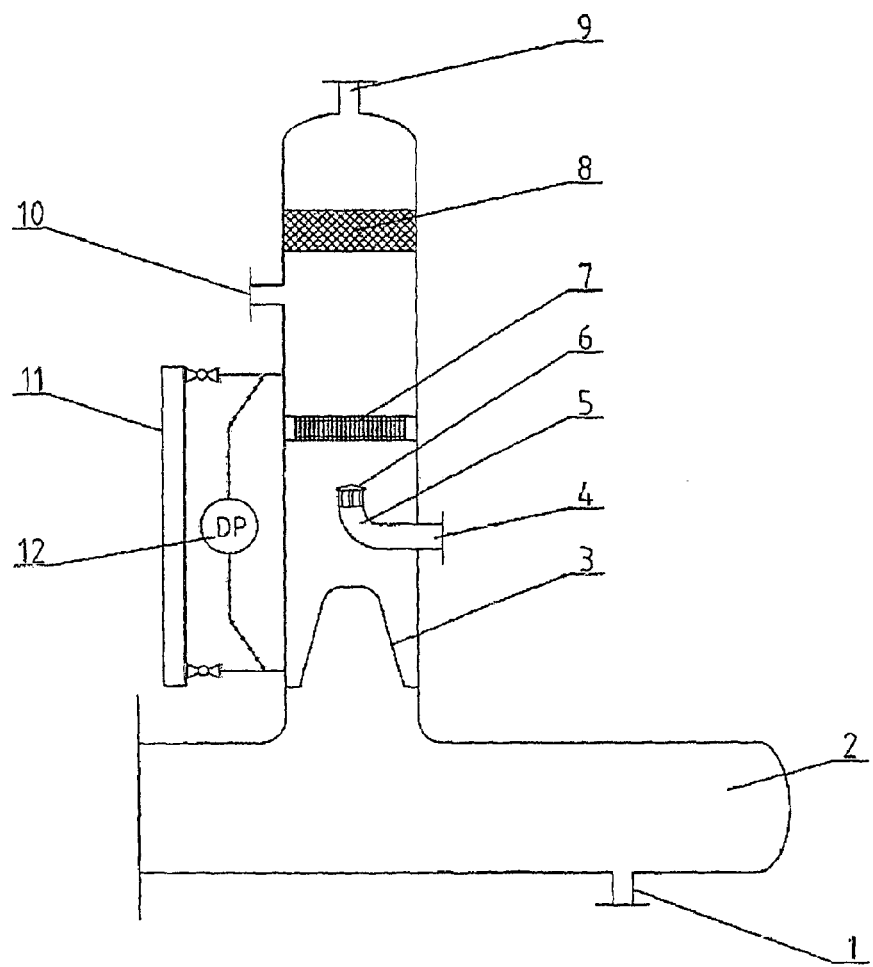
FIG. 2 is a schematic diagram of an embodiment of a water removing device for extremely high water cut oil-gas-water three phase flow of the invention.

FIG. 2 is a schematic diagram of an embodiment of a water removing device for extremely high water cut oil-gas-water three phase flow of the invention.

In FIG. 2, a reference number 1 represents a free water outlet connection pipe section, a reference number 2 represents a liquid collection chamber, a reference number 3 represents an oil filter, a reference number 4 represents a mixture liquid outlet connection pipe section, a reference number 5 represents a fluid directing duct, a reference number 6 represents a baffle plate, a reference number 7 represents a fluid stabilizer, a reference number 8 represents a mist eliminator, a reference number 9 represents a gas outlet connection pipe section, a reference number 10 represents an inlet connection pipe section, a reference number 11 represents a liquidometer, and a reference number 12 represents a pressure differential transmitter.

Its process is as follows: firstly, a gas-liquid gravity separation process is occurred in the water removing device after the extremely high water cut oil-gas-water three phase flow entered into the water removing device via the inlet connection pipe section 10; a mist eliminator 8 is provided at the upper part of the water removing device, and a gas outlet connection pipe section 9 is provided at the top end of the water removing device, the separated gas discharged from the gas outlet connection pipe section 9 after being mist-eliminated via the mist eliminator; a fluid stabilizer 7, which is mounted in a horizontal direction, is provided below the inlet connection pipe section 10 within the water removing device, for further eliminating the unstable flow state of the mixture liquid, and improving the effect of the free water separation, increasing the metering accuracy. A fluid directing duct 5 is provided below the fluid stabilizer, the fluid directing duct 5 being connected with a mixture liquid outlet connection pipe section 4. After the gas-liquid separated liquid is rectified by the fluid stabilizer 7, the free water entered into the bottom of the water removing device, and the mixture liquid containing oil in the upper part of the liquid is discharged from the mixture liquid outlet connection pipe section 4 via the fluid directing duct 5. A baffle plate 6 is provided at the top of the fluid directing duct 5 for baffling impurities from upstream. In order to increase the resident time of the mixture liquid within the water removing device, and improve the free water separation efficiency, an outwardly enlarged liquid collection chamber 2 is provided at the bottom of the water removing device, and an oil filter 3 is provided above the liquid collection chamber 2. The free water, which entered into the liquid collection chamber 2 via the oil filter 3, is discharged from the free water outlet connection pipe section 1, FIG. 3 is a schematic diagram of an another embodiment of a water removing device for extremely high water cut oil-gas-water three phase flow of the invention.

Figure 3:
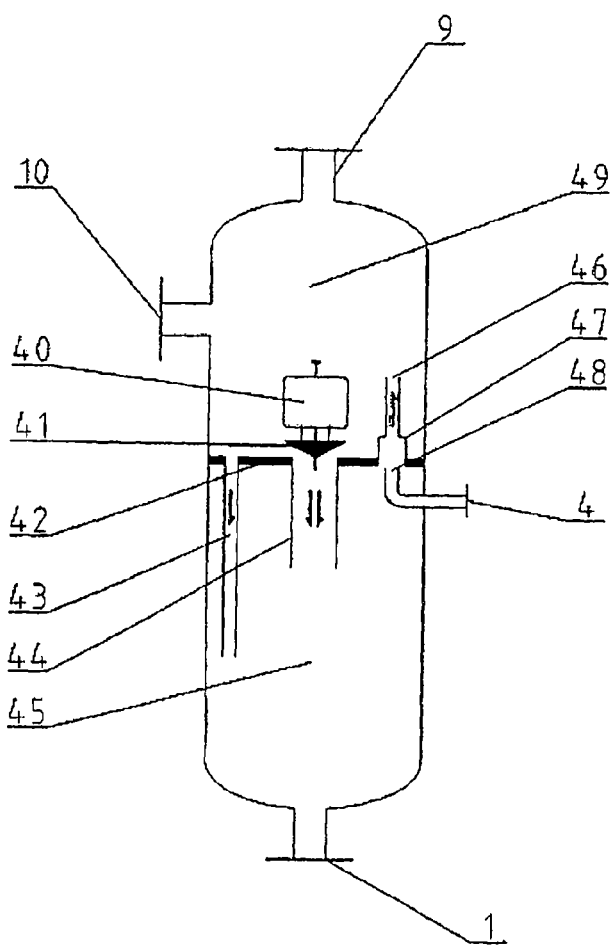
FIG. 3 is a schematic diagram of an another embodiment of a water removing device for extremely high water cut oil-gas-water three phase flow of the invention.

In FIG. 3, a reference number 1 represents a free water outlet connection pipe section, a reference number 4 represents a mixture liquid outlet connection pipe section, a reference number 9 represents a gas outlet connection pipe section, a reference number 10 represents an inlet connection pipe section, a reference number 40 represents a solid floater, a reference number 41 represents a throttle valve, a reference number 42 represents a spacer of the device, a reference number 43 represents a free water outlet, a reference number 44 represents an intermissive liquid discharging duct, a reference number 45 represents a separation chamber of the device, a reference number 45 represents a gas return port, a reference number 47 represents an oil collection chamber, a reference number 48 represents an oil discharging duct inlet, and a reference number 49 represents a buffer chamber of the device.

Its process is as follows: after the extremely high water cut oil-gas-water three phase flow entered into a buffer chamber 49, the gas is discharged from the gas discharging outlet, and the liquid sunk to the bottom of the buffer chamber 49, and a little of free water entered into the bottom of the separation chamber 45 via the free water outlet 43. Since most of liquid is collected in the bottom of the buffer chamber 49, the solid floater 40 is floated as the liquid level is uprising, causing the throttle valve 41 slide upwards and the intermissive liquid discharging duct 44 opened, thereby a majority of liquid would flow into the separation chamber 45. As the majority of liquid entered into the separation chamber 45, the liquid level of the buffer chamber continuously descended. When the liquid level descended to a certain height, the throttle valve 41 closed, then the flow resistance of the liquid is increased, restricting the discharging speed of the liquid in the separation chamber 45, preventing a majority of gas from entering the separation chamber, reducing the probability of the gas entering the oil discharging duct inlet 48. After the throttle valve 41 is closed, the liquid within the buffer chamber entered into the separation chamber only through the free water outlet 43. The liquid entered into the separation chamber is separated under the gravity, and a majority of the free water is discharged via the free water outlet connection pipe section 1. A little of oil-water mixture floated to the top of the separation chamber 43, discharged from the oil discharging duct inlet 48 after being collected at the oil collection chamber 47. An extremely little of gas is returned to the buffer chamber 49 via the return port 46, reducing the probability of the liquid level decreasing in the separation chamber 45 and the probability of the gas escaping from the oil discharging pipe section.

Figure 4:
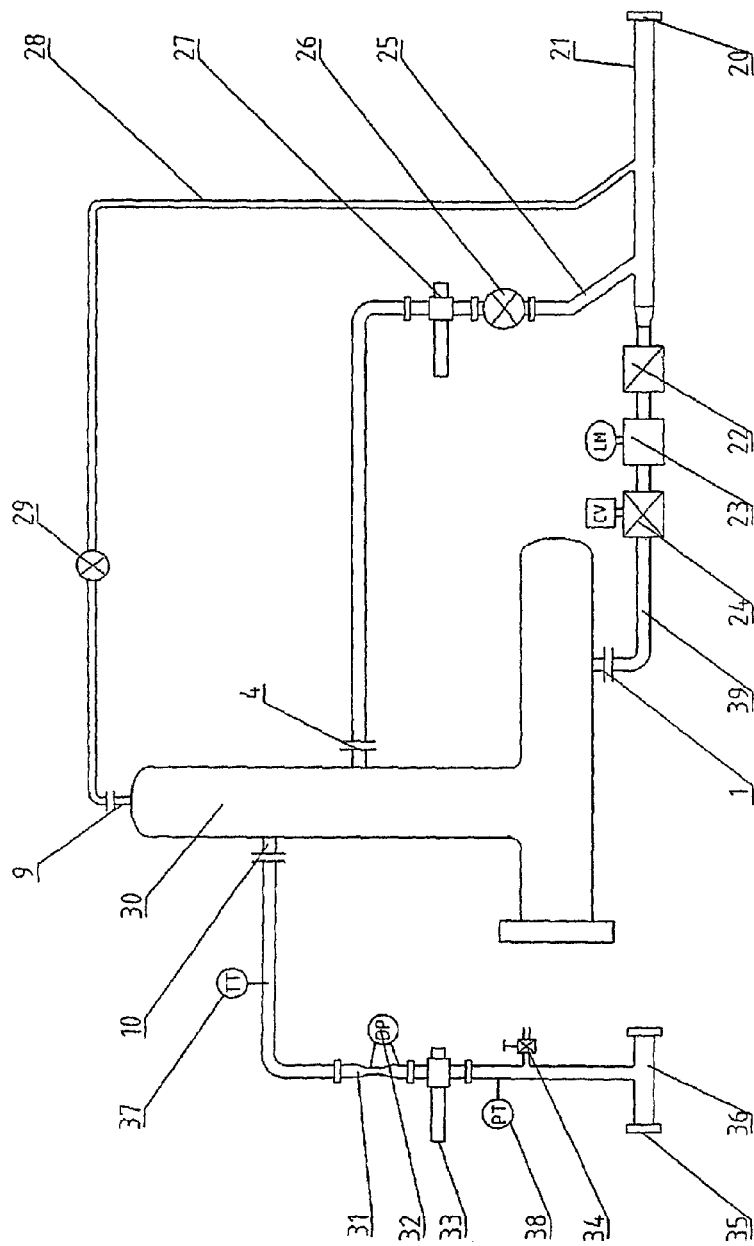
FIG. 4 is a schematic diagram of an embodiment of measurement apparatus for extremely high water cut oil-gas-water three phase flow of the invention.

FIG. 4 is a schematic diagram of an embodiment of measurement apparatus for measuring the flow rate of the extremely high water cut oil-gas-water three phase flow of the invention.

In FIG. 4, a reference number 1 represents a free water outlet connection pipe section, a reference number 4 represents a mixture liquid outlet connection pipe section, a reference number 9 represents a gas outlet connection pipe section, a reference number 10 represents an inlet connection pipe section, a reference number 20 represents a petroleum pipe line metering exit end, a reference number 21 represents a flow collection pipe section, a reference number 22 represents a check valve, a reference number 23 represents a single-phase flowmeter such as an electromagnetic flowmeter for metering the water flow rate, a reference number 24 represents a control valve of the water discharging pipe section or the flow rate control valve, a reference number 25 represents an oil discharging pipe section, a reference number 26 represents a control valve in the oil discharging pipe section, a reference number 27 represents a three-phase water cut meter such as dual-γ water cut meter, a reference number 28 represents a gas discharging pipe section, a reference number 29 represents a control valve of the gas discharging pipe section or a flow rate control valve, a reference number 30 represents a water removing device, a reference number 31 represents a differential pressure type flow measurement means such as a Venturi tube, a reference number 32 represents a pressure differential transmitter, a reference number 33 represents a densimeter such as a single-γ densimeter/phase fraction meter, a reference number 34 represents a sampling port of an inlet pipe line, a reference number 35 represents a metering inlet end of a petroleum pipe line, a reference number 36 represents a blind three-way mixing means, a reference number 37 represents a temperature transmitter, a reference number 38 represents a pressure transmitter, and a reference number 39 represents a water discharging pipe section.

During the measuring process, the extremely high water cut oil-gas-water three-phase flow from the petroleum pipe line firstly entered a blind three-way mixing means 36, changing the original flow state of the oil-gas-water three-phase flow, and mixed thereof; A densimeter (such as a single-γ densimeter/phase fraction meter) 33 measured the mixture density and the gas volume fraction GVF of the oil-gas-water three phase flow, the differential pressure type flow measurement device such as a Venturi tube 31 and the pressure differential transmitter 32 measured the total flow rate Q by measuring the differential pressure ΔP of the total flow rate of the extremely high water cut oil-gas-water three phase flow; the pressure transmitter 38, and the temperature transmitter 37 measured the pressure and the temperature of the pipe line, respectively. The gas is discharged from the gas discharging pipe section 28 after the extremely high water cut oil-gas-water three-phase flow entered the water removing device and gas-liquid separated and free water removed, then entering the flow collection pipe section 21; the mixture fluid containing oil is discharged from the oil discharging pipe section 25. A three-phase water cut meter 27 such as a dual-γ water cut meter is mounted on the oil discharging pipe section 25, for measuring the water cut WC of this mixture fluid containing oil. The control valve 26 in the oil discharging pipe section can adjust its opening degree automatically according to the gas volume fraction GVF measured by the three-phase water cut meter 27 to control the gas volume fraction in the oil discharging pipe section, thereby ensuring the measurement accuracy of the water cut WC. The end of the oil discharging pipe section 25 is connected with the flow collection pipe section 21. The free water is discharged from the free water outlet connection pipe section 1, entering a single-phase flowmeter such as an electromagnetic flowmeter 23 for metering the flow rate of water, measuring the flow rate $Q'_w$ of the free water, entering the petroleum pipe line via the flow collection pipe section 21. According to the result of the liquid level detected by the differential pressure transmitter12 or a liquidometer 11 in the water removing device 30, the control valve 24 of the free water discharging pipe section and the control valve 29 of the gas discharging pipe section can adjust its opening degree by itself, to control the liquid level to a certain height, preventing the gas from entering the water discharging pipe section, or preventing the excessive gas from entering the oil discharging pipe section 25 or preventing the liquid from entering the gas discharging pipe section or preventing the oil from entering the water discharging pipe section.

All of the measured data is calculated by the computer processing system, then outputting the measured result such as each phase flow rate of the oil-gas-water three-phase flow.

Figure 5:
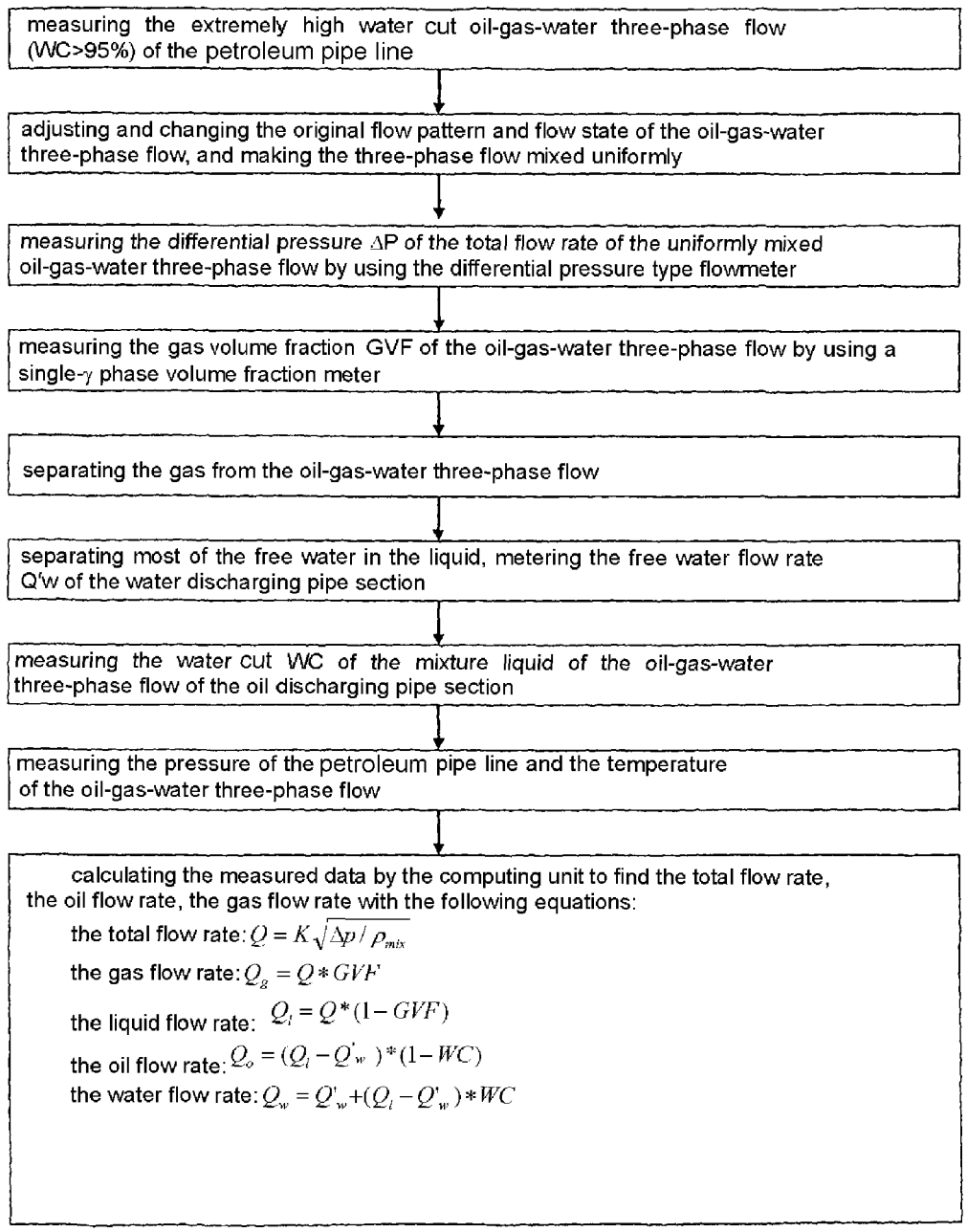
FIG. 5 is a main flowchart of a measurement method for measuring the flow rate of the oil-gas-water three phase flow using the measurement apparatus for measuring the flow rate of the extremely high water cut oil-gas-water three phase flow.

FIG. 5 is a main flowchart of a measurement method for measuring the flow rate of the oil-gas-water three phase flow using measurement apparatus for measuring the flow rate of the extremely high water cut oil-gas-water three phase flow.

The measurement method includes the following steps:

5-1 adjusting and changing the original flow pattern and flow state of the oil-gas-water three-phase flow, and making the three-phase flow mixed uniformly;

5-2 measuring the differential pressure ΔP of the total flow rate of the uniformly mixed oil-gas-water three-phase flow by using a differential pressure type flowmeter such as a Venturi tube;

5-3 measuring the mixture density and the gas volume fraction GVF of the oil-gas-water three-phase flow by using the densimeter such as a single-γ densimeter phase fraction meter;

5-4 separating the gas from the oil-gas-water three-phase flow;

5-5 separating most of the free water in the liquid, metering the free water flow rate $Q'_w$ of the water discharging pipe section;

5-6 measuring the water cut WC of the mixture liquid of the oil-gas-water three-phase flow of the oil discharging pipe section;

5-7 measuring the pressure of the inlet pipe line and the temperature of the oil-gas-water three-phase flow;

5-8 calculating the measured data by the computing unit to find the total flow rate, the oil flow rate, and the gas flow rate with the following equations:

the total flow rate: $Q=K\sqrt{\Delta p/\rho_{mix}}$ the gas flow rate: $Q_g=Q*GVF$ the liquid flow rate: $Q_l=Q*(1-GVF)$ the oil flow rate: $Q_o=(Q_l-Q'_w)*(1-WC)$ the water flow rate: $Q_w=Q'_w+(Q_l-Q'_w)*WC$;

wherein K is a system parameter and $\rho_{mix}$, is the mixture density of the three-phase flow.

The invention claimed is:

1. A device for removing water from a high water cut oil-gas-water three phase flow, the device comprising:
   an inlet connection pipe,
   a gas outlet connection pipe along a top portion of the device,
   a free water outlet connection pipe along a bottom portion of the device,
   a mixed oil-water liquid outlet connection pipe, for discharging any mixed oil-water liquid, and
   a fluid stabilizer mounted below the inlet connection pipe and above the mixed oil-water liquid outlet connection pipe, wherein said fluid stabilizer is configured to eliminate an unstable flow state of the mixed oil-water liquid and improve an effect of free water separation,
   wherein the device is configured such that a gas-liquid gravity separation process occurs when the high water cut oil-gas-water three phase flow enters device via the inlet connection pipe, and separated free water enters the bottom portion of the device and is discharged via the free water outlet connection pipe.

2. The device according to claim 1, wherein a liquid collection chamber is provided at the bottom of the device.

3. The device according to claim 2, wherein an oil filter is provided above the liquid collection chamber for further removing oil from the separated free water, and wherein the free water may be discharged from the free water outlet connection pipe after the free water has resided in the liquid collection chamber for a period of time.

4. The device according to claim 1, further comprising a pressure differential transmitter or a liquidometer, which may be used to detect in real time a liquid level within the device.

5. The device according to claim 1, further comprising a spacer for dividing the device into an upper portion, which is used as a buffer chamber and a lower portion, which is used as a separation chamber, wherein the buffer chamber is connected with the inlet connection pipe section and the separation chamber is connected with the free water outlet connection pipe.

6. The device according to claim 5, further comprising:
   an intermissive liquid discharging duct connecting the buffer chamber to the separation chamber;
   a throttle valve provided at an upper portion of the intermissive liquid discharging duct;
   a floater provided on top of the throttle valve;
   an oil collection chamber provided above the spacer;
   a gas return port provided at the top of the oil collection chamber; and
   an oil discharging duct inlet provided at the bottom of the oil collection chamber.

7. A measurement apparatus comprising: the device of claim 1,
a mixer mounted on a petroleum pipe line connected to said inlet connection pipe,
a differential pressure type flow measurement device for measuring the total flow rate of an oil-gas-water three-phase flow,
a pressure differential transmitter,
a densitometer for measuring a mixture density and a gas volume fraction GVF of the oil-gas-water three phase flow,
a flow collection pipe,
an oil discharging pipe,
a three-phase water cut meter,
a gas discharging pipe comprising a first control valve;
a water discharging pipe comprising a second control valve;
a single-phase flow meter for metering the water flow rate; and
a computing unit,
wherein the mixed oil-water liquid outlet connection pipe of the device may be connected with the three-phase water cut meter, which is connected with the flow collection pipe in order to measure the water cut (WC) and the gas volume fraction (GVF') in the mixed oil-water liquid.

8. The measurement apparatus according to claim 7, further comprising:
a third control valve provided between the three-phase water cut meter and the flow collection pipe, wherein the third control valve is adjusted automatically based on the measured gas volume fraction (GVF'), thereby controlling the GVF' in the oil discharging pipe, and ensuring accuracy of the water cut measurement.

9. A method for measuring the flow rate of an oil-gas-water three phase flow, comprising the steps of:
(a) providing the measurement apparatus of claim 7;
(b) adjusting the flow pattern and flow state of the oil-gas-water three-phase flow to uniformly mix the three phase flow;
(c) obtaining the water cut WC' measurement of the three-phase flow by sampling the three-phase flow at an inlet pipe line;
(d) measuring the differential pressure $\Delta P$ of the total flow rate of the uniformly mixed three-phase flow using the differential pressure type flow meter;
(e) measuring the mixture density and the gas volume fraction GVF of the three-phase flow using the densitometer;
(f) separating the gas from the three-phase flow;
(g) separating a portion of the free water and metering the free water flow rate $Q'_w$ of the water discharging pipe;
(h) measuring the water cut WC of the mixed oil-water liquid of the oil discharging pipe;
(i) measuring the pressure of the inlet pipe line and the temperature of the oil-gas-water three-phase flow; and
(j) calculating the measured data using the computing unit to find the total flow rate, the oil flow rate, the gas flow rate and the water flow rate with the following equations:
the total flow rate: $Q=K\sqrt{\Delta p/\rho_{mix}}$,
the gas flow rate: $Q_g=Q*GVF$,
the liquid flow rate: $Q_l=Q*(1-GVF)$
the oil flow rate: $Q_o=(Q_l-Q'_w)*(1-WC)$, and
the water flow rate: $Q_w=Q'_w+(Q_l-Q'_w)*WC$ $Q_w=Q'_w+(Q_l-Q'_w)*WC$;
wherein K is a system parameter and $\rho_{mix}$ is the mixture density of the three-phase flow.

10. The device of claim 1, further comprising a mist eliminator provided at the top portion of the device for eliminating mist from separated gas, such that mist-eliminated gas is discharged via the gas outlet connection pipe.

11. The device of claim 1, further comprising a fluid directing duct provided below the fluid stabilizer, wherein the fluid directing duct is connected with the mixed oil-water liquid outlet connection pipe.

12. The device according to claim 11, wherein a baffle plate is provided on top of the fluid directing duct for baffling impurities from upstream.

13. The device of claim 5, wherein the spacer is horizontal.

14. The device according to claim 6, wherein the intermissive liquid discharging duct is in a middle portion of the spacer.

15. The device according to claim 6, wherein the floater is a solid floater.

16. The measurement apparatus of claim 7, wherein the mixer is a blind three-way mixer.

* * * * *